J. W. BARNES.
Fertilizer.
No. 19,477.
Patented Mar 2, 1858.
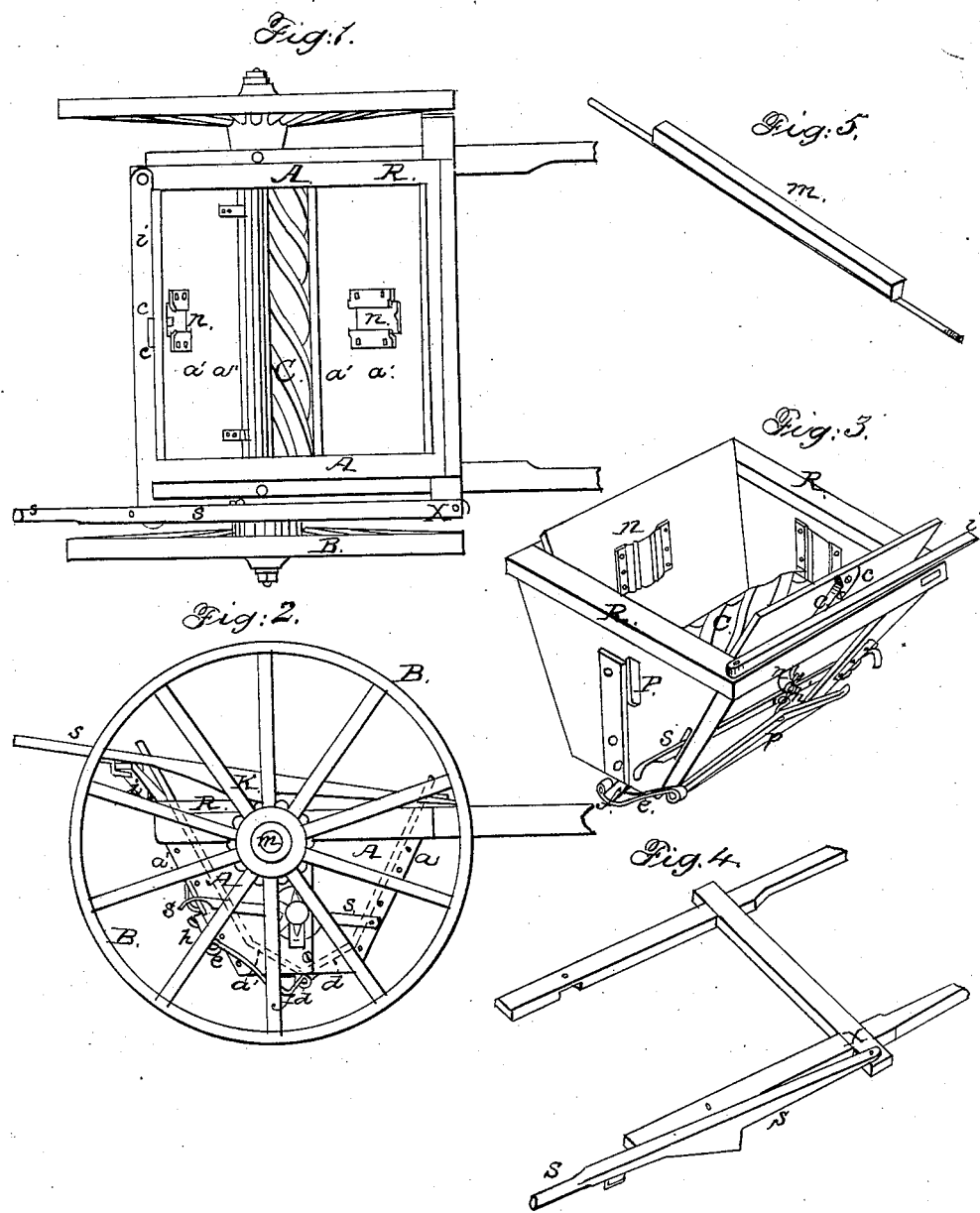

UNITED STATES PATENT OFFICE.

JETHRO W. BARNES, OF MURFREESBOROUGH, NORTH CAROLINA.

IMPROVEMENT IN MANURE-WAGONS.

Specification forming part of Letters Patent No. 19,477, dated March 2, 1858.

*To all whom it may concern:*

Be it known that I, JETHRO W. BARNES, of Murfreesborough, in the county of Hertford and State of North Carolina, have invented an Improvement in Wagons for Distributing Manure; and I do hereby declare that the following is a full, clear, and exact description of the principle or character which distinguishes it from all other things before known, and of the usual manner of making, modifying, and using the same, reference being had to the accompanying drawings, of which—

Figure 1 is a plan of the wagon; Fig. 2, an end view of the same; Fig. 3, a perspective view of the wagon as used for sowing in drills; Fig. 4, a view of the shafts; Fig. 5, a view of the axle.

My invention consists in an improvement on my manure-wagon patented October 14, 1836, described as follows:

By reference to the drawings, Fig. 1 represents a plan view of the wagon with all the parts arranged for sowing broadcast, and Fig. 2 shows an end view of the same.

The manner of distributing the manure from this machine is as follows: The wagon-body A is furnished with two inclined sides, $a\ a'$, one of which is made to work up and down, and at the same time has a vibratory motion given it by a wedge-shaped piece, $c$, fastened to the outside and resting on the lever $i$. The movement of this side greatly facilitates the shaking of the manure to the bottom of the body, where are provided two hinged pieces, $d\ d'$, which open and close the passage through which the manure drops. These inclined pieces are operated to open and close with the movement of the side $a'$. The piece $d'$ is hinged to and is raised and lowered with this side, which is operated by the following contrivance: Two bent straps, $e$, one at each end of the wagon-body A, are connected with the hinged piece $d$, as seen in Figs. 2 and 3, and pass under projections $f\ f$ on the ends of piece $d$, and serve as bearings for this piece. They then extend up and have pivot-connections $g\ g$ to the ends of a cross-support, $h$. To the center of this support is attached a chain, $h'$, which extends up and is secured to lever $i$, resting on the top of the wagon-body. The end of this lever is operated by a spur-wheel fixed to the hub of wheel B through the medium of cam-lever $k$, one end of which is pivoted at $x$ to the frame of the shafts.

C is a screw-shaft placed inside of and near the bottom of the wagon-body, which has a vertical adjustment, and on one end of this shaft is provided a pinion, which meshes into the gear on the hub of wheel B. This screw-shaft grinds and feeds the manure to the discharge-opening and prevents its choking up in the bottom of the machine. The screw-shaft can be thrown in and out of gear with the spur-wheel, and is not used when sowing in drills, which operation will now be described—viz., converting the broadcast into a drill machine. For this purpose it is necessary to have the opening in the bottom of the wagon in a line with the drill or furrow in which the manure is to be sown, and to accomplish this end the axle-tree $m$ is removed and passed through openings $n\ n$ in the sides $a\ a'$, the opening in the movable side $a'$ being made considerably larger than the axle-tree to give this side free play. The openings P P in the ends are then closed to prevent the manure escaping therefrom. The frame of the shafts is then placed under the ledge R, projecting from the top of the body A and over the axle, and there secured. The wagon-body A is shown in Fig. 3 with the shafts and axle-tree detached. When the parts are all arranged and secured in their proper places for sowing in drills, motion is given to the side $a'$ and bottom pieces, $b\ b'$, by the hand-lever $k$, operated from behind the machine, and present the appearance shown in Fig. 3.

What I claim is—

1. Converting the broadcast-distributer into a drill-machine by reversing the axle, substantially in the manner set forth.

2. The movable side or end $a$, in combination with the sliding bottom $q$, as set forth, whether the machine is used for a drill or broadcast machine.

JETHRO W. BARNES.

Witnesses:
L. P. SPIERS,
L. J. BARNES.